United States Patent
Singh et al.

(10) Patent No.: US 8,182,153 B2
(45) Date of Patent: May 22, 2012

(54) BEARING DAMPER WITH SPRING SEAL

(75) Inventors: Anant Pal Singh, Cincinnati, OH (US); Michael Slusher, Hamilton, OH (US); Albert Frank Storace, Cincinnati, OH (US); James C. Austrow, Cincinnati, OH (US); Tony Metz, Harrison, OH (US)

(73) Assignee: General Electric Company, Schenectady, NY (US)

( * ) Notice: Subject to any disclaimer, the term of this patent is extended or adjusted under 35 U.S.C. 154(b) by 512 days.

(21) Appl. No.: 12/395,074

(22) Filed: Feb. 27, 2009

(65) Prior Publication Data

US 2010/0220948 A1   Sep. 2, 2010

(51) Int. Cl.
F16C 27/00 (2006.01)
F16C 33/76 (2006.01)

(52) U.S. Cl. ............ 384/99; 384/94; 384/477; 384/581; 384/607

(58) Field of Classification Search .................... 384/99, 384/119, 130, 215, 477, 481, 487, 489, 515, 384/535–536, 581–582
See application file for complete search history.

(56) References Cited

U.S. PATENT DOCUMENTS

| | | | |
|---|---|---|---|
| 4,214,796 A | 7/1980 | Monzel et al. | |
| 4,775,248 A * | 10/1988 | Barbic et al. | 384/99 |
| 4,971,457 A * | 11/1990 | Carlson | 384/99 |
| 4,981,415 A * | 1/1991 | Marmol et al. | 384/215 |
| 4,992,024 A * | 2/1991 | Heydrich | 384/99 |
| 5,048,978 A | 9/1991 | Singh | |
| 5,056,935 A | 10/1991 | Singh | |
| 5,071,262 A | 12/1991 | Monzel et al. | |
| 5,085,521 A * | 2/1992 | Singh | 384/99 |
| 5,106,208 A | 4/1992 | Bobo et al. | |
| 5,169,240 A | 12/1992 | Bobo et al. | |
| 5,169,241 A | 12/1992 | Singh | |
| 5,178,400 A | 1/1993 | Singh | |
| 5,188,375 A | 2/1993 | Pope et al. | |
| 5,197,807 A | 3/1993 | Kuznar | |
| 5,201,585 A | 4/1993 | Gans et al. | |
| 5,207,511 A | 5/1993 | Bobo | |
| 5,215,384 A * | 6/1993 | Maier | 384/99 |
| 5,228,784 A | 7/1993 | Bobo | |
| 5,251,985 A | 10/1993 | Monzel | |
| 5,316,391 A | 5/1994 | Monzel | |
| 5,320,134 A | 6/1994 | Singh | |
| 5,344,239 A | 9/1994 | Stallone et al. | |
| 5,374,129 A | 12/1994 | Vohr et al. | |
| 6,071,076 A | 6/2000 | Ansari et al. | |

(Continued)

FOREIGN PATENT DOCUMENTS

EP   109346 A2 *  5/1984

(Continued)

*Primary Examiner* — Marcus Charles
(74) *Attorney, Agent, or Firm* — David J. Clement; Tregc, Hines & Ladenheim, PLLC

(57) ABSTRACT

A bearing damper includes: (a) an annular sleeve having spaced-apart grooves formed in a radially-facing surface therein; (b) an annular bearing race received in the sleeve; and (c) a resilient seal ring disposed in each of the grooves, wherein the seal rings cooperate with the sleeve and a radially-facing surface of the bearing race to define a closed annular gap, and further wherein the seal rings are sized so as to urge the bearing race towards a coaxial position relative to the sleeve.

11 Claims, 3 Drawing Sheets

U.S. PATENT DOCUMENTS

| | | | |
|---|---|---|---|
| 6,135,639 A | 10/2000 | Dede | |
| 6,695,478 B2 * | 2/2004 | Bos et al. | 384/99 |
| 6,872,003 B2 * | 3/2005 | Dusserre-Telmon et al. | 384/99 |
| 7,182,519 B2 | 2/2007 | Singh et al. | |
| 7,296,398 B2 | 11/2007 | Moniz et al. | |
| 7,334,982 B2 | 2/2008 | Singh et al. | |
| 7,435,004 B2 | 10/2008 | Singh et al. | |
| 7,517,152 B1 * | 4/2009 | Walsh | 384/99 |
| 7,625,121 B2 * | 12/2009 | Pettinato et al. | 384/122 |
| 2007/0086685 A1 * | 4/2007 | Klusman et al. | 384/99 |

FOREIGN PATENT DOCUMENTS

| | | | |
|---|---|---|---|
| EP | 1167788 A1 * | 1/2002 | |
| EP | 1174629 A1 * | 1/2002 | |
| EP | 1808580 A2 * | 7/2007 | |
| EP | 2148102 A1 * | 1/2010 | |
| JP | 54030338 A * | 3/1979 | |
| JP | 55107114 A * | 8/1980 | |
| JP | 09112549 A * | 5/1997 | |

* cited by examiner

BEARING DAMPER WITH SPRING SEAL

FIELD OF THE INVENTION

This invention relates generally to rotating bearings, and more particularly to squeeze film dampers for bearings associated with high speed turbomachinery.

BACKGROUND OF THE INVENTION

In a typical squeeze film shaft damper arrangement, a shaft with its associated rolling element bearing are permitted to have some limited radial motion in the supporting bearing housing. Ordinarily an annular outer race of a rolling element closely fits in an annular chamber in the support housing where two opposing closely adjacent circumferential surfaces of the housing and race define a thin annular squeeze film space into which an oil under pressure is introduced for damping action.

The use of film dampers in gas turbine engines causes increased clearances for rotor blades and labyrinth seals leading to increased specific fuel consumption ("SFC") and reduced sealing margins. The effectiveness of the damper is generally improved if the clearance is increased and the damper is sealed. Prior art dampers for turbine engine applications are typically sealed with concentric piston ring type seals which circumferentially engage the bearing housing to seal off the squeeze film space between the rings.

Some prior art dampers are mounted in a centralized spring structure, such as a squirrel cage. This is effective to limit clearances, but the spring structure increases the bearing cost and weight.

BRIEF SUMMARY OF THE INVENTION

These and other shortcomings of the prior art are addressed by the present invention, which provides a bearing damper with an integrated centering spring and sealing apparatus.

According to one aspect of the invention, a bearing damper includes: (a) an annular sleeve having spaced-apart grooves formed in a radially-facing surface therein; (b) an annular bearing race received in the sleeve; and (c) a resilient seal ring disposed in each of the grooves, wherein the seal rings cooperate with the sleeve and a radially-facing surface of the bearing race to define a closed annular gap, and further wherein the seal rings are sized so as to urge the bearing race towards a coaxial position relative to the sleeve.

According to another aspect of the invention a bearing support apparatus for a gas turbine engine includes: (a) a stationary housing which defines an annular recess; (b) an annular sleeve received in the recess, the sleeve having spaced-apart grooves formed therein; (c) a bearing having annular inner and outer races, the outer race received in the recess; (d) a shaft received in the inner race; and (e) a resilient seal ring disposed in each of the grooves, wherein the seal rings cooperate with the sleeve and the outer race to define a closed annular gap, and the seal rings are sized so as to urge the bearing towards a coaxial position relative to the sleeve.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
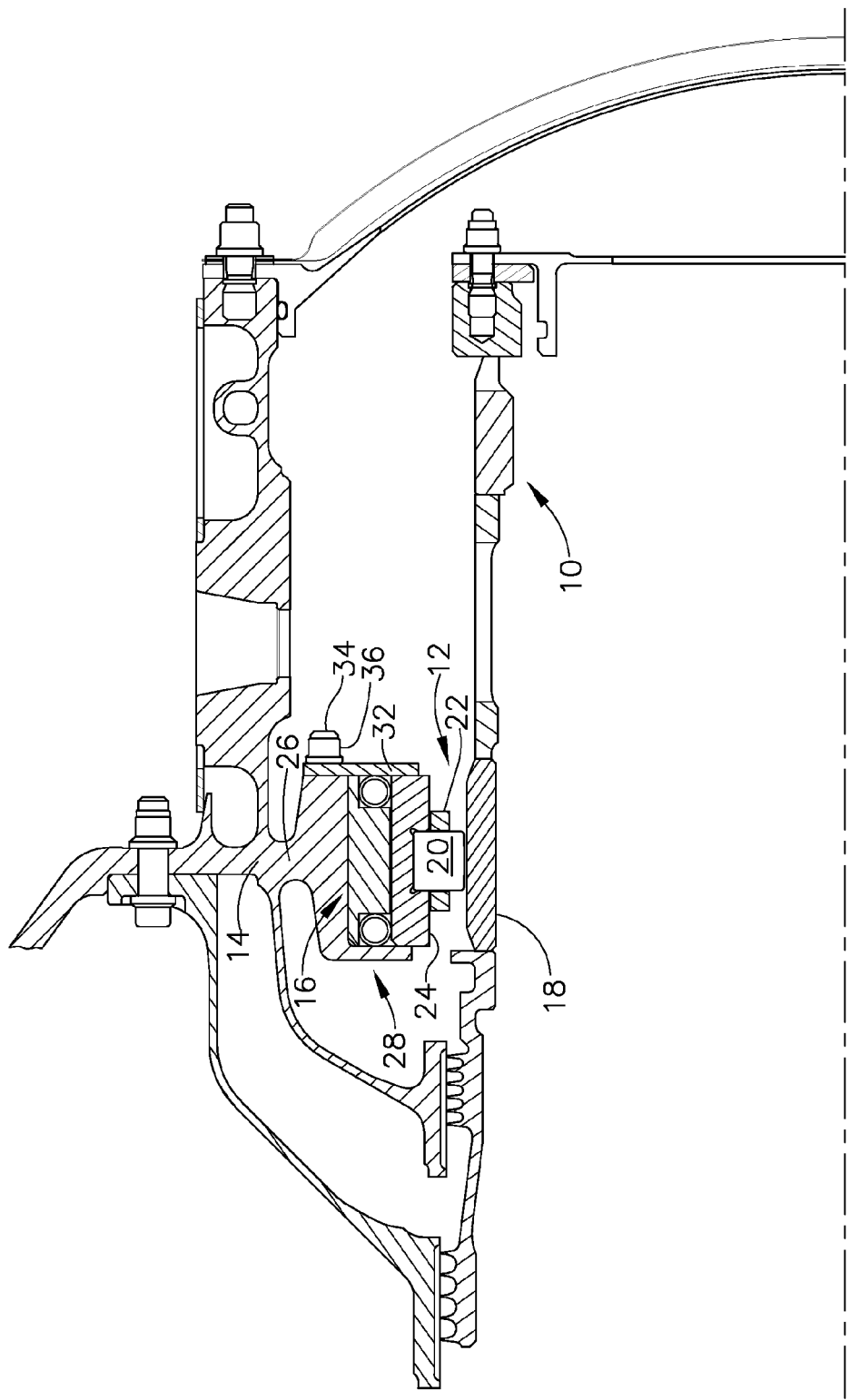
FIG. 1 is a cross-sectional view of a portion of a gas turbine engine showing a bearing sump thereof.

Referring to the drawings wherein identical reference numerals denote the same elements throughout the various views, FIG. 1 depicts a portion of an enclosed chamber or "sump" of a gas turbine engine, which in this case is a turboshaft engine. This is merely an example of a specific application, and the principles of the present invention are equally applicable to all kinds of turbomachinery such as turbojet, turboprop, and turbofan engines, as well as other types of machinery which use bearing dampers.

Within the sump, a shaft 10 of the engine is supported for rotation in a rolling-element bearing 12, in this case a roller bearing. A static annular frame member 14 surrounds the bearing 12. The bearing 12 is carried by the frame member 14 through a squeeze film bearing damper 16, which is described in more detail below. The bearing 12 includes an annular inner race 18 mounted on the shaft 10, a plurality of rollers 20 restrained by a cage 22, and an annular outer race 24.

The frame member 14 incorporates a radially-inwardly extending arm 26, the inboard end of which defines a housing 28. The housing 28 includes a recess 30 (see FIG. 2) that receives the bearing damper 16. In the illustrated example the housing forms the forward end and outer wall of the recess, and the aft end of the recess 30 is closed off by a separate annular retainer 32 which is secured to the housing 28, for example using threaded studs 34 and nuts 36, or other fasteners. This configuration facilitates removal and replacement of the damper 16 and/or bearing 12.

Figure 2:
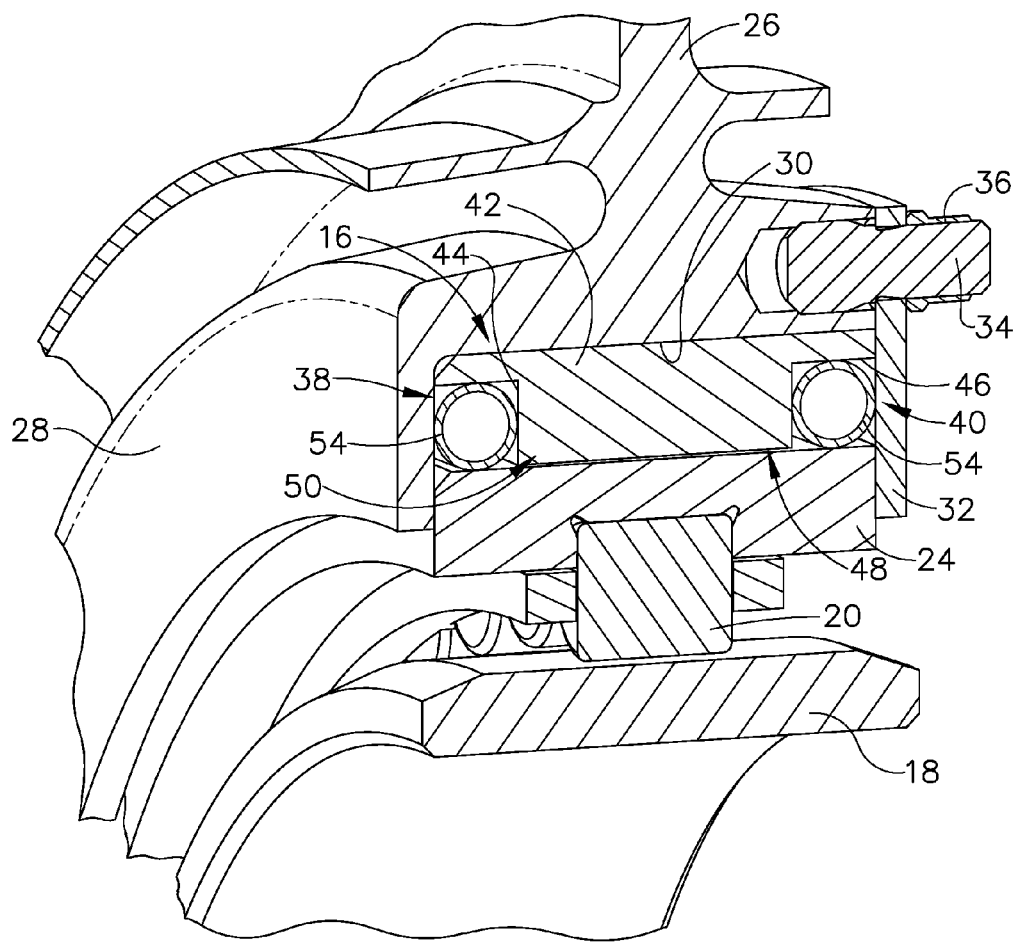
FIG. 2 is a perspective cross-sectional view of a portion of the bearing sump shown in FIG. 1, illustrating a spring damper seal constructed according to an aspect of the present invention.

FIG. 2 illustrates the damper 16 in more detail. The recess 30 of the housing 28 is annular with a generally rectangular cross-sectional shape having forward and aft ends 38 and 40, respectively. An annular sleeve 42 is received in the recess 30. The sleeve 42 is stationary in operation and is secured against rotation within the housing 28, for example through an interference fit. Any alloy which has a suitable life in the application may be used. For weight savings, the sleeve 42 may be made from a lightweight material such as aluminum or titanium alloy. A forward groove 44 having a square cross-section is formed in the inner surface 48 of the sleeve 42 adjacent the forward end 38 of the recess 30, and an aft groove 46 having a square cross-section is formed in the inner surface 48 of the sleeve 42 adjacent the aft end 40 of the recess 30.

The outer race 24 of the bearing 12 is received in the recess 30 inboard of the sleeve 42. The outer race 24 (and consequently the remainder of the bearing 12) is restrained from moving in an axial direction but is free to move radially to some degree. A small annular gap 50 is provided between the inner surface 48 of the sleeve 42 and the outer surface of the outer race 24. Means are provided, in a known manner, for circulating pressurized oil through this annular gap 50. For example, oil circulation may be implemented by providing supply and scavenge passages (not shown) in the housing 28 and/or sleeve 42 which are connected to an oil pump (not shown). In a known manner, upon rotation of shaft 10, any shaft rotor imbalance will cause shaft 10 and bearing 12 to undergo radial motion and subject oil in the annular gap 50 to very high pressure to force viscous flow of the oil and cause a damping action on the outer race 24.

An annular seal ring 54 is assembled into each of the forward and aft grooves 44 and 46. In the illustrated example, the seal ring 54 is a continuous "O"-ring element having a circular cross-section. Any material with appropriate stiffness and fatigue life may be used to construct the seal ring 54. The geometry of the seal ring cross section, such as the wall thickness, diameter, etc. may be selected to provide desired stiffness characteristics for the seal ring 54, for example the spring constant "K" in the radial direction. The functional characteristics of the seal ring 54 may be further tuned and optimized by combining a spring (not shown) in series with the seal ring 54. The seal rings 54 resiliently bear against the outer race 24 and seal off the forward and aft ends of the annular gap, and also provide a radial centering force on the bearing 12 that urges the outer race 24 into a position coaxial with the sleeve 42.

Figure 3:
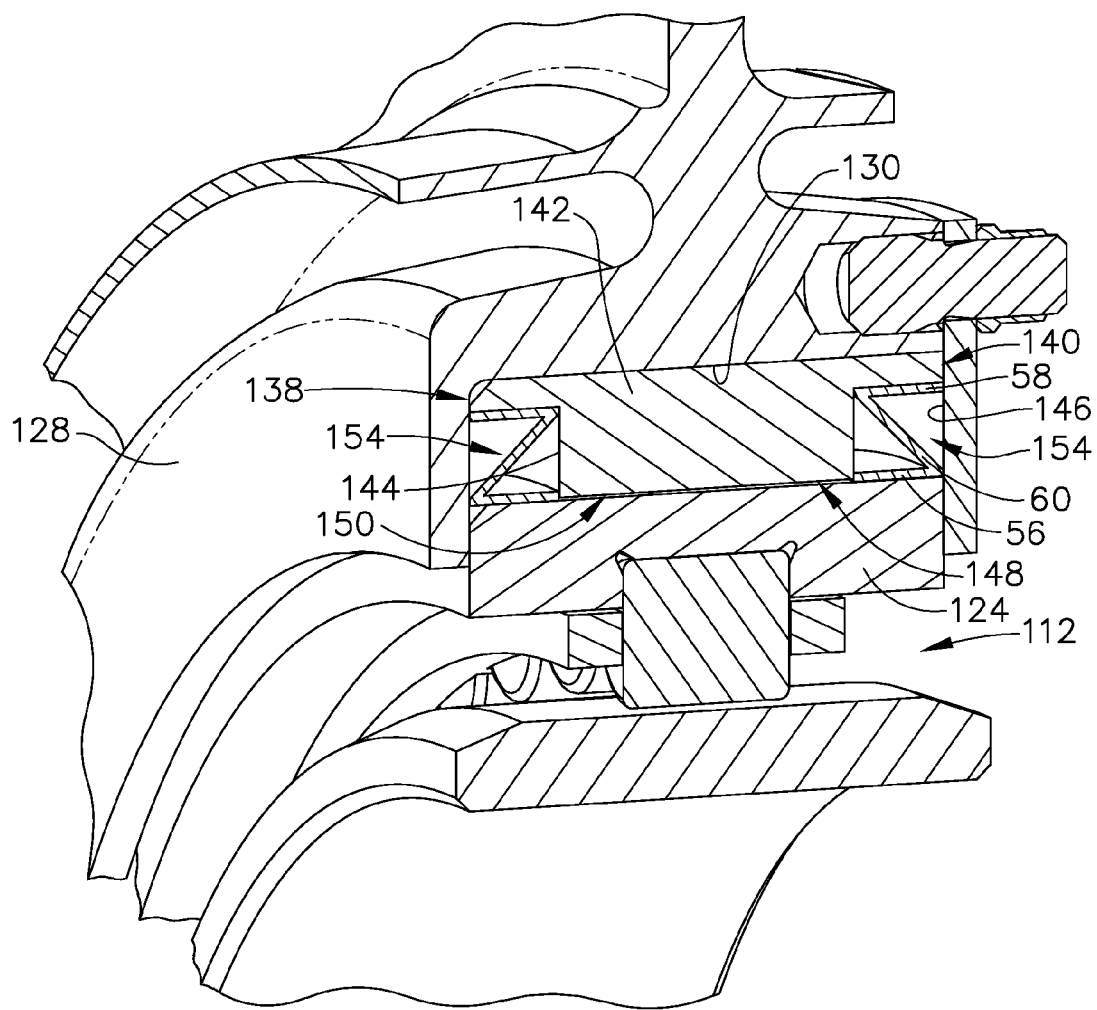
FIG. 3 is a perspective cross-sectional view of a portion of the bearing sump shown in FIG. 1, illustrating an alternative spring damper seal constructed according to an aspect of the present invention.

FIG. 3 illustrates an alternative damper configuration mounted in a recess 130 of a housing 128 which is identical to the housing 28 described above and which has forward and aft ends 138 and 140. A sleeve 142 having forward and aft grooves 144 and 146 is received in the recess 130. The outer race 124 of a bearing 112 is received in the recess 130 inboard of the sleeve 142. A small annular gap 150 is provided between an inner surface 148 of the sleeve 142 and the outer surface of the outer race 124.

Identical annular seal rings 154 are assembled into each of the forward and aft grooves 144 and 146. The seal ring 154 has a cross-sectional shape which provides a resilient characteristic in the radial direction. Some examples include "Z", "C", "I", or "T" shapes. In this particular example, the cross section is generally "Z" shaped including inner and outer flanges 56 and 58 interconnected by a web 60. The geometry of the seal ring cross section, such as the material thickness, angle of the web 60, fillet radii, etc. may be selected to provide desired stiffness characteristics for the forward seal ring 154, for example the spring constant "K" in the radial direction. The seal rings 154 seal against the outer race 124 to close off the forward and aft ends of the annular gap 150, and also provide a radial centering force on the bearing 112 that urges the outer race 124 into a position coaxial with the sleeve 142.

The damper designs described above can be modified in various ways. For example, the seal rings 54 or 154 and a portion of the sleeve 42 or 142 could be integrated as a single component to further reduce the assembly and part count. Furthermore, the functional characteristics of the seal ring 54 or 154 may be further tuned and optimized by combining a spring (not shown) in series with in the seal ring 54 or 154.

The bearing damper configurations described herein provide multiple advantages over prior art film damper sealing technology. Combining the sealing function with the centering spring element eliminates the need for prior art piston rings that are used to seal the end leakage of the annular gap 50. The sleeve 42 which incorporates grooves for the seal rings 50 will be less expensive to manufacture, maintain, and repair compared to typical designs which require complex machining in a structural outer bearing race. The complete film damper system will be significantly less expensive as well. Sealing via 360° energized rings provides improved squeeze film damping action due to little or no side leakage. This completely eliminates any potential for high side leakage due to mis-assembly or misalignment of piston rings. The overall radial stiffness of the damper can be varied over a wide range. Outer race heat generation will be efficiently balanced by the sealed circumferential cavity that has a continuous circulating lubricant supply.

The bearing damper will provide improved operating internal radial clearance (IRC) control for the bearing 12, and the overall reduced clearance range for the engine rotor-stator clearance provides net specific fuel consumption (SFC) improvements.

The foregoing has described a spring seal damper for a gas turbine engine. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

What is claimed is:

1. A bearing damper, comprising:
   (a) an annular sleeve having spaced-apart grooves formed in a radially-facing surface therein;
   (b) an annular bearing race received in the sleeve; and
   (c) a resilient seal ring disposed in each of the grooves, wherein each of the seal rings is a physically continuous member disposed in continuous sealing contact both an axially extending surface of the respective groove and a axially extending surface of the bearing race, wherein the seal rings cooperate with the sleeve and the axially extending surface of the bearing race to define a closed annular gap, and further wherein the seal rings are sized so as to urge the bearing race towards a coaxial position relative to the sleeve.

2. The bearing damper of claim 1 wherein each of the seal rings has a generally circular cross-sectional shape.

3. The bearing damper of claim 1 wherein each of the seal rings has a Z-shaped cross-sectional shape comprising inner and outer flanges interconnected by a web.

4. The bearing damper of claim 1 wherein the radially-facing surface of the sleeve faces radially inwards, and the radially-facing surface of the bearing race faces radially outwards.

5. The bearing damper of claim 1 where the bearing race is an outer race of a bearing which includes a plurality of rolling elements disposed between the outer race and an inner race.

6. A bearing support apparatus for a gas turbine engine, comprising:
(a) a stationary housing which defines an annular recess;
(b) an annular sleeve received in the recess, the sleeve having spaced-apart grooves formed therein;
(c) a bearing having annular inner and outer races, the outer race received in the recess;
(d) a shaft received in the inner race; and
(e) a resilient seal ring disposed in each of the grooves, wherein each of the seal rings is a physically continuous member disposed in continuous sealing contact both an axially extending surface of the respective groove and an axially extending surface of one of the bearing races, wherein the seal rings cooperate with the sleeve and the outer race to define a closed annular gap, and the seal rings are sized so as to urge the bearing towards a coaxial position relative to the sleeve.

7. The bearing support apparatus of claim 6 wherein each of the seal rings has a generally circular cross-sectional shape.

8. The bearing support apparatus of claim 6 wherein each of the seal rings has a Z-shaped cross-sectional shape comprising inner and outer flanges interconnected by a web.

9. The bearing support apparatus of claim 6 wherein the bearing race is an outer race.

10. The bearing support apparatus of claim 6 wherein the bearing race is an outer race of a bearing which includes a plurality of rolling elements disposed between the outer race and an inner race.

11. The bearing support apparatus of claim 6 wherein the housing defines a first axial end and an outer wall of the recess, and an a second axial end of the recess is closed off by a separate annular retainer which is secured to the housing.

* * * * *